INVENTOR.
RICHARD C. WEBB
BY
Sheridan and Ross
ATTORNEYS

INVENTOR.
RICHARD C. WEBB
BY
Sheridan and Ross
ATTORNEYS

June 4, 1968 R. C. WEBB 3,387,287

DIGITAL DATA STORAGE CIRCUIT FOR DATA RECORDING AND TRANSMISSION SYSTEMS

Filed Feb. 17, 1965 3 Sheets-Sheet 3

INVENTOR.
RICHARD C. WEBB
BY
Sheridan and Ross
ATTORNEYS

United States Patent Office 3,387,287

Patented June 4, 1968

3,387,287

DIGITAL DATA STORAGE CIRCUIT FOR DATA RECORDING AND TRANSMISSION SYSTEMS

Richard C. Webb, Broomfield, Colo., assignor to Colorado Instruments, Inc., Broomfield, Colo., a corporation of Colorado Filed Feb. 17, 1965, Ser. No. 433,431
10 Claims. (Cl. 340—173)

ABSTRACT OF THE DISCLOSURE

This invention is a digital memory circuit. A neon tube is connected in series with a switch between a pair of sources of potential of opposite polarity. Connected to the junction between the switch and the neon lamp are the anodes of a pair of diodes. One diode of each pair is a holding diode and its cathode is connected to a third source of potential. The cathode of each holding diode is also connected to a scan switch. The cathode of each transfer diode is connected to a data line. When one of the first switches is closed, the neon tube connected to it lights. When the scan switch is closed, the neon tube connected to it lights. When the scan switch is closed, the ignited neon tube applies a voltage through its transfer diode to its data line. In addition, amplification and control means are provided so that the transfer signal can be used to control elements such as relays.

This invention relates to a digital memory circuit coupled with means for transferring data to external recording or transmission circuits.

The use of digital data processors and computers is rapidly becoming commonplace in business and industry. Furhermore, the demand for digital encoding of data into a form which is immediately usable by a computer at a point as close as possible to the source of each transaction giving rise to the data has become very desirable. Frequently it also is desirable to provide logical supervision and lockout of data entry facilities in order to screen human errors or to perform limited arithmetical functions within the data collection device.

Accordingly, it is an important object of this invention to provide a data system characterized by flexibility of circuitry and circuit component assembly to meet the requirements of a wide variety of specific data collection problems.

Another object of this invention is to provide a simple, low-cost digital memory circuit into which data can be entered manually and is then capable of being recovered from the memory, one digit at a time, for recording or transmission.

A further object of this invention is to provide an inexpensive, reliable digital memory circuit capable of receiving manually introduced data and adapted for yielding data from its memory, a digit at a time, to control external circuits including relays, transistor logic circuits, and the like.

Additional objects of this invention will become apparent from the following description, which is given primarily for purposes of illustration, and not limitation.

Stated in general terms, the objects of the invention are attained by providing a mutual lockout or one-at-a-time memory circuit, such as a circuit including a multiplicity of neon lamps connected so that only one of the lamps is permitted to glow at a given time. Coupled to such a memory circuit may be a system of electric current transfer gates which permits the scanning of the memory and transfer of data contained in the memory into recording and transmission circuits coupled to the system of electric current transfer gates. Furthermore, a system of electric current amplifiers may, in turn, be combined with, or coupled to the system of current transfer gates and the memory circuit to provide sufficient electric currents to control external relays, transistor logic circuits, and the like components, elements or circuits.

A more detailed description of a specific embodiment of the invention is given below with reference to the accompanying drawings, wherein.

Figure 1:
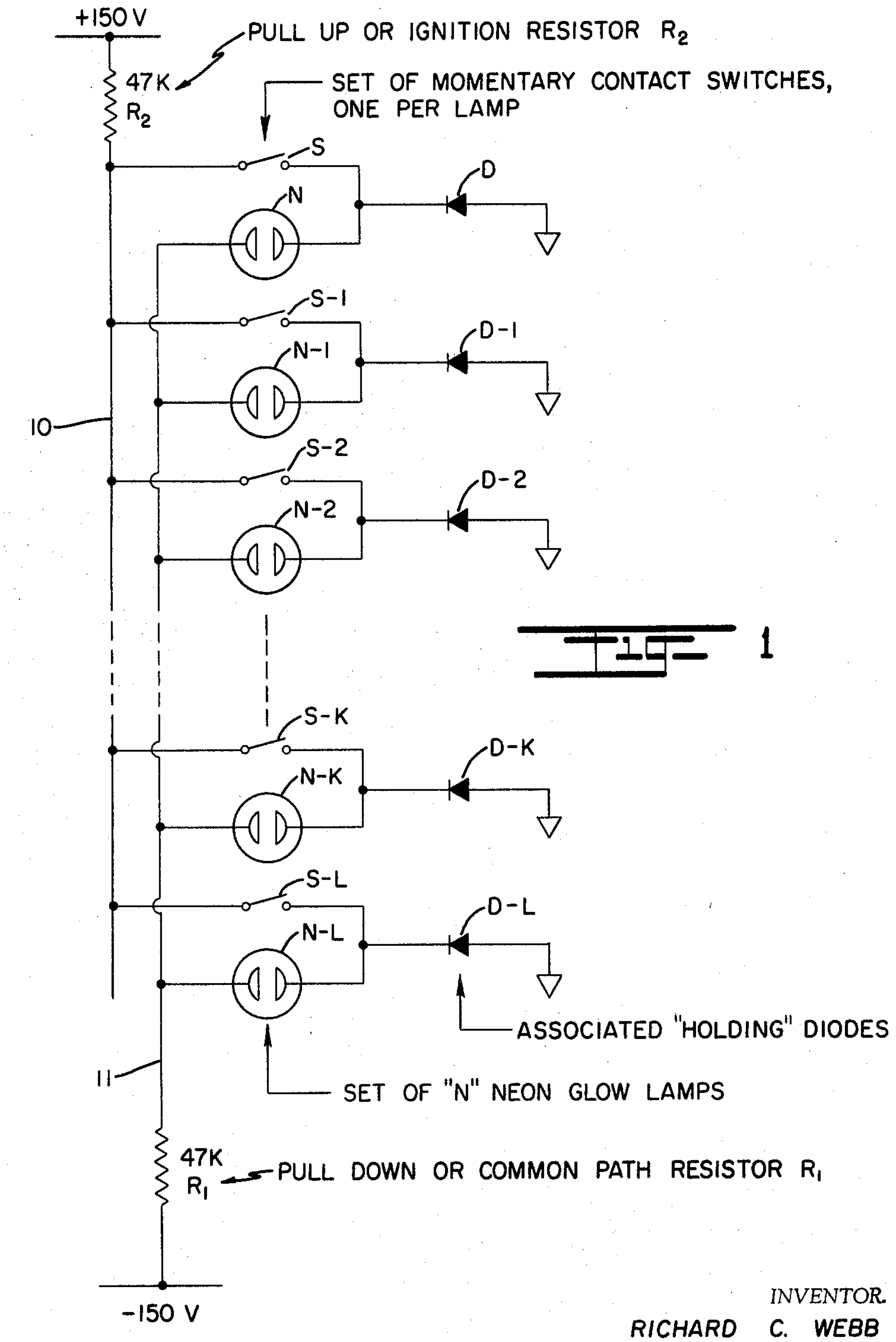
FIGURE 1 is a circuit diagram showing a mutual lockout, or one-at-a-time memory circuit in accordance with the invention.

The memory circuit shown in FIGURE 1 is one portion of a storage unit which serves as a general purpose mutual lockout circuit. It includes a set of neon glow lamps denoted *n*, *n*–1, *n*–2, . . . *n*–*k*, *n*–L, etc., depending upon the number of lamps employed in the set. For convenience only a few of the lamps have been shown in the memory circuit of FIGURE 1 to describe the feature of the circuit to provide a one-at-a-time characteristic, or mutual lockout of all except one of the glow lamps at a given time.

A set of momentary contact switches *s*, *s*–1, *s*–2, . . . *s*–*k*, *s*–L, etc., is provided as shown in FIGURE 1 to correspond with the set of neon glow lamps. Each switch, such as switch *s*, is connected to one of the neon glow lamps, such as lamp *n*, for example, to produce a set of paired lamps and switches, as shown. Each of the momentary contact switches is directly connected to a +150 volt common line 10, the voltage of which is arbitrarily chosen for explanatory purposes. Each of the neon glow lamps is connected to a −150 volt common line 11 at the connection of the lamp opposite the one connected to the momentary contact switch, as shown in FIGURE 1. A common path 47,000 ohms (47K) resistor $R_1$ is connected between a −150 volt source and the −150 volt line 11 and a similar common path ignition resistor $R_2$ is connected a +150 volt source and the +150 volt line 10 as shown. A set of associated holding diodes *d*, *d*–1, *d*–2, . . . *d*–*k*, *d*–L, etc., is used in the memory circuit, each having its anode connected to ground, and its cathode connected to a circuit which is connected across lines 10 and 11 and which includes a neon glow lamp and a momentary contact switch.

The operation of a specific embodiment of the memory circuit of FIGURE 1 will be given with arbitrarily chosen values of parameters merely to more clearly explain the operation of the circuit and not to limit the scope of the invention in any manner. Assume that the typical neon glow lamp used in the set of lamps in the memory circuit has a maintaining voltage of about 80 volts. The purpose of each momentary contact switch is to connect the lamp to which it is connected in a set across the +150 volt line 10 and the −150 volt line 11. When the switch of a set, such as switch *s*–*k*, for example, is held closed, such as by a person making a data entry into the memory, the lamp of the set, *n*–*k* in this case, is subjected to an initial voltage of about 300 volts across its terminals. Assuming further that the lamp has a normal break-down, threshold or ignition potential of about 100 volts, the lamp *n*–*k* will be ignited and a current flow therein will be established. This established current flow will cause a voltage drop of about 80 volts. It is seen that the remaining approximately 220 volts across the circuit of the ignited *n*–*k* lamp and the switch *s*–*k* between lines 10 and 11 will be taken up equally across the two common path resistors $R_1$ and $R_2$ of about 47,000 ohms each, which are shown at the extreme terminals of the connection of voltage lines 10 and 11 to the voltage sources. Under this ignited lamp condition, a current flow of about 2.34 milliamperes is established through the circuit of the ignited lamp *n–k* and the switch *s–k* between lines 10 and 11. A voltage drop of about 110 volts exists across the lower common path resistor $R_1$ under this ignited lamp condition, thus placing the voltage on voltage line 11, which is common to all of the neon glow lamps in the entire set of lamps connected in the memory circuit, at about −40 volts, which is a voltage value well below the extinction voltage of all of the remaining lamps in the entire set of lamps. Thus none of the remaining lamps will become ignited under this condition of one lamp *n–k* being ignited and that one ignited lamp *n–k* will remain in the ignited condition so long as the momentary contact switch *s–k*, to which it is connected, is closed.

Upon opening the momentary contact switch *s–k*, the glowing neon lamp *n–k* connected thereto finds a path for its current through the holding diode *d–k*, connected to the glowing lamp *n–k* and also connected to ground potential. The path of current from voltage line 11 through glowing neon lamp *n–k* and holding diode *d–k* to ground potential permits the continuance of the glow maintaining voltage of about 80 volts to exist across glowing neon lamp *n–k* and the maintenance of the approximately 70 volts remaining of the approximately −150 volts to exist across the common path resistor $R_1$. A current of about 1.49 milliamperes flows from ground potential through holding diode *d–k*, glowing neon lamp *n–k* and the common path resistor $R_1$ to the −150 volt source. As an ignition potential of at least about 100 volts is required to ignite any of the remaining neon glow lamps in the entire set of lamps, exclusion of all of the remaining neon glow lamps in the entire set from ignition is assured by the low voltage of about 80 volts existing thereupon under this condition of one glowing lamp *n–k* in the memory circuit with its associated momentary contact switch *s–k* in the open position.

Should a different momentary contact switch, such as switch *s–2*, now be pressed to the closed position, neon glow lamp *n–2* will receive, through closed switch *s–2*, more than sufficient voltage, namely about 150 plus 80, or about 230 volts, through line 11 to ignite lamp *n–2* to the glowing condition. At the same time that momentary contact switch *s–2* is closed, the flow of current through the circuit of lamp *n–2* and switch *s–2* is sufficient to reduce the voltage on the common voltage line 11 far below about 40 volts, which is the approximate limiting voltage required to maintain neon glow lamp *n–k* in the glowing condition. Thus lamp *n–k* is extinguished at the instant lamp *n–2* is ignited. It is seen, therefore, through the use of this mutual exclusion effect of the memory circuit of FIGURE 1, comprising the holding diodes *d*, *d–1*, *d–2*, . . . *d–k*, *d*–L, etc., the common path resistor $R_1$, the momentary contact switches *s*, *s–1*, *s–2*, . . . *s–k*, *s*–L, etc., and ignition resistor $R_2$, a one-at-a-time or lockout circuit is provided wherein one, and only one, neon glow lamp in a given set of *n*, *n–1*, *n–2*, . . . *n–k*, *n*–L, etc., lamps in the memory circuit can remain in the conducting ignited or glowing state upon withdrawal or opening of all of the switching contacts in the total set of switches.

The mutual exclusion, lockout or one-at-a-time memory circuit described hereinabove with reference to FIGURE 1 can serve as the basis for a system of digital data acquisition equipment. This is accomplished by coupling the memory circuit with means for transferring the electric current which normally flows through that particular one of the neon glow lamps that is ignited and glowing at a particular time or instant, from its normal holding path to ground, into an external path which is common to a large number, or set, of memory circuits of the type described with reference to FIGURE 1. Such a digital data acquisition system requires the transfer of data from any given set of such memory circuits at the discretion or selection of an external strobing or scanning means operating on the data contained or indicated by the several neon glow lamp registers of the several memory circuits described above relative to FIGURE 1, as a specific example.

Although the memory circuit of the invention was described hereinabove as containing a set of neon glow lamps, it will be understood that the neon glow lamps *n*, *n–1*, *n–2*, . . . *n–k*, *n*–L, etc., can be replaced by any set of suitable components having an activation voltage threshold and a deactivation voltage threshold in a manner similar to the neon glow lamps. Similarly, the set of holding diodes *d*, *d–1*, *d–2*, . . . *d–k*, *d*–L, etc., described hereinabove can be replaced by any set of suitable components having the property of conducting current preferentially in one direction relative to the other direction, that is, rectification characteristics.

Figure 2:
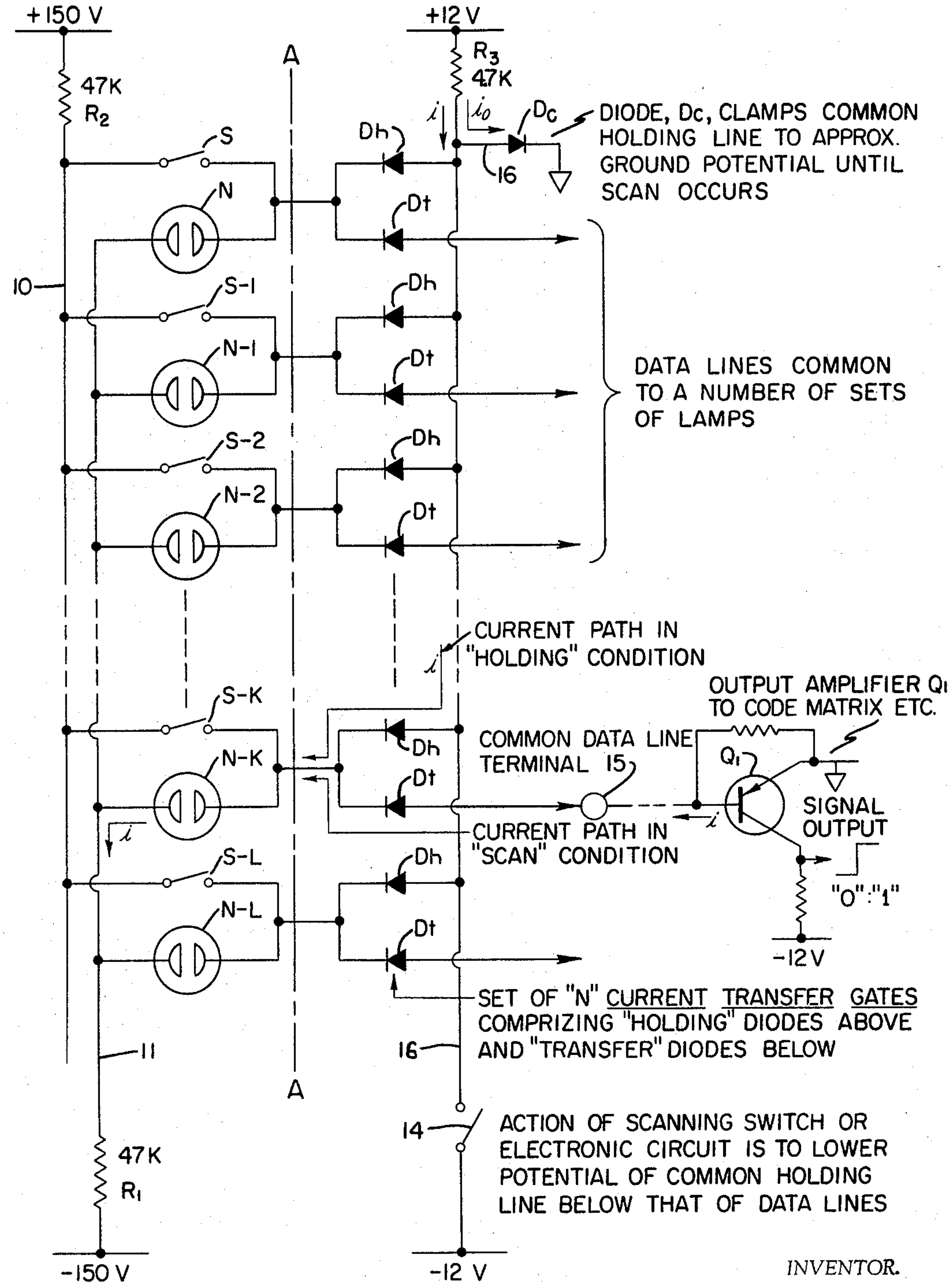
FIGURE 2 is a circuit diagram showing a system of transfer gates coupled to the memory circuit of FIGURE 1 according to the invention.

FIGURE 2 shows how a memory circuit similar to that of FIGURE 1 having mutual exclusion, mutual lockout or one-at-a-time characteristics can be coupled to a system of current transfer gates in accordance with the invention. FIGURE 2 also shows a specific embodiment of the basic circuit of a current transfer gate contemplated by the invention. The neon glow lamp memory circuit shown to the left of the vertical broken line A—A is similar to the memory circuit shown in FIGURE 1 but omits the holding diodes and their ground potential connections. The circuit immediately to the right of vertical broken line A—A shows a set of current transfer gates, each gate of the set consisting of a pair of diodes polarized, as shown in FIGURE 2, with the cathodes of both diodes of the pair connected in common with the particular neon glow lamp which the pair of diodes is serving. The upper diode of each pair of diodes is labeled $D_h$ to symbolize the holding property of the upper diode while the lower diode of each pair of diodes is labeled $D_t$ to designate that this diode of each pair provides the transfer path, or the path to which the neon glow lamp current switches, when the data register is placed in the scanning or strobing condition.

The pairs of diodes $D_h$ and $D_t$, forming the set of transfer gates, are in turn connected to a common voltage line 16. Voltage line 16 is connected at its upper end to a steady voltage source of about +12 volts, chosen arbitrarily, through the resistor $R_3$ having a resistance of about 4,700 ohms (4.7K). A clamping diode $D_c$ is connected to voltage line 16 just below resistor $R_3$ and has its cathode terminal connected to ground potential. The lower end of voltage line 16 is connected to a source of steady −12 volts approximately, through a scanning switch 14. An output PNP transistor amplifier $Q_1$ is connected at its base terminal to a common data line terminal 15. The common terminal 15 is connected to the anode of one of the transferred diodes $D_t$ to illustrate how the signal from a neon tube passes through a transfer diode to an amplifying output transistor.

The unique circumstance under which the neon glow current switches from the holding diode $D_h$ to the transfer diode $D_t$ in the current transfer gate of a glowing lamp is brought about through the resistor $R_3$. The lower terminal of resistor $R_3$ provides a common line 16 to the holding diodes $D_h$ of all the neon glow lamp circuits of the entire set of lamps *n*, *n–1*, *n–2*, . . . *n–k*, *n*–L, etc. The potential of this common line 16 is established at about ground potential through the clamping action of diode $D_c$, the cathode terminal of which is connected to ground potential. As a current of about +12 volts is applied to the upper terminal of resistor $R_3$, a current $i_o$ is furnished via resistor $R_3$ to ground through the path provided by the forward-biased clamping diode $D_c$. This current $i_o$ is predetermined in the specific embodiment of this invention being illustrated to be somewhat in excess of the approximately 1.5 milliampere current which normally flows in one of the neon glow lamp circuits. Thus ample current is available from the common line 16 to supply holding current to any one of the entire set of neon glow lamps that may be ignited by manual operation of one of the momentary contact switches connected thereto. With this arrangement the neon glow lamp memory circuit of FIGURE 2 functions in essentially the same manner as described with respect to the memory circuit of FIGURE 1, that is, before the current transfer gate feature was coupled with the memory circuit.

The scanning operation will be explained while assuming that neon glow lamp *n–k* is in the glow condition. The scanning operation involves closing scanning switch 14. This switch can be either a mechanical contact switch or an electronic circuit (not shown) capable of lowering the potential of the common line 16, connected to the lower terminal of resistor $R_3$, to a potential considerably below the ground potential. For purposes of simplicity, it has been indicated that common line 16 is switched to a potential of $-12$ volts by closing scanning switch 14 for conducting the scanning operation. At the time of the scanning operation, by closing switch 14, the current path to ground provided by the holding diode $D_h$, associated with the ignited and glowing neon glow lamp *n–k* of the memory circuit, and the clamping diode $D_c$ is less attractive (lower in potential) than the current path to ground provided by the path to ground via the emitter-base junction of output amplifier $Q_1$ and transfer diode $D_t$. Thus the current $i$ switches from the holding path via holding diode $D_h$ to the transfer path through transfer diode $D_t$, as shown in FIGURE 2 by arrows and labels. A current $i$ of about 1.5 milliamperes is now found in the emitter-base junction of output amplifier $Q_1$. This current turns on output amplifier $Q_1$, elevates its collector potential from its normal $-12$ volt value to a value close to ground, that is, to about $-0.6$ volt.

This low potential is the signal that a binary one (1) as distinguished from a zero (0), exists on the line connected to the lighted or glowing neon glow lamp *n–k*. This signal is used to designate one of ten digits in a numeric recording and transmission system in accordance with methods well known in the art. In actual practice the digital data system includes one or more of the mutual lockout neon glow lamp registers, each one being representative of numeric digits from 0 through 9, together with means for scanning the digits stored on the various registers. The scanning action brings out the signals representing the various digits through a data code translation and feeds them into a suitable digital data recording medium such as punch cards, punch tape, magnetic tape, and the like. Thus, through the combination of the exclusive or mutual lockout neon glow lamp memory circuit coupled with the current transfer gate system, as illustrated in FIGURE 2, the capability of storing data and recovering it at will through the scanning action has been achieved.

The above-described combination of a mutual lockout neon glow lamp memory with a current transfer gate system serves to store and transfer data but often it is desired to make use of numbers stored on a field of numeric registers to simultaneously achieve control of external devices such as remote indicator lamps, motor control relays, digital logic circuits, arithmetic manipulation of digits contained on the neon glow lamp registers, verification of validity of data entered on said registers, etc.

Figure 3:
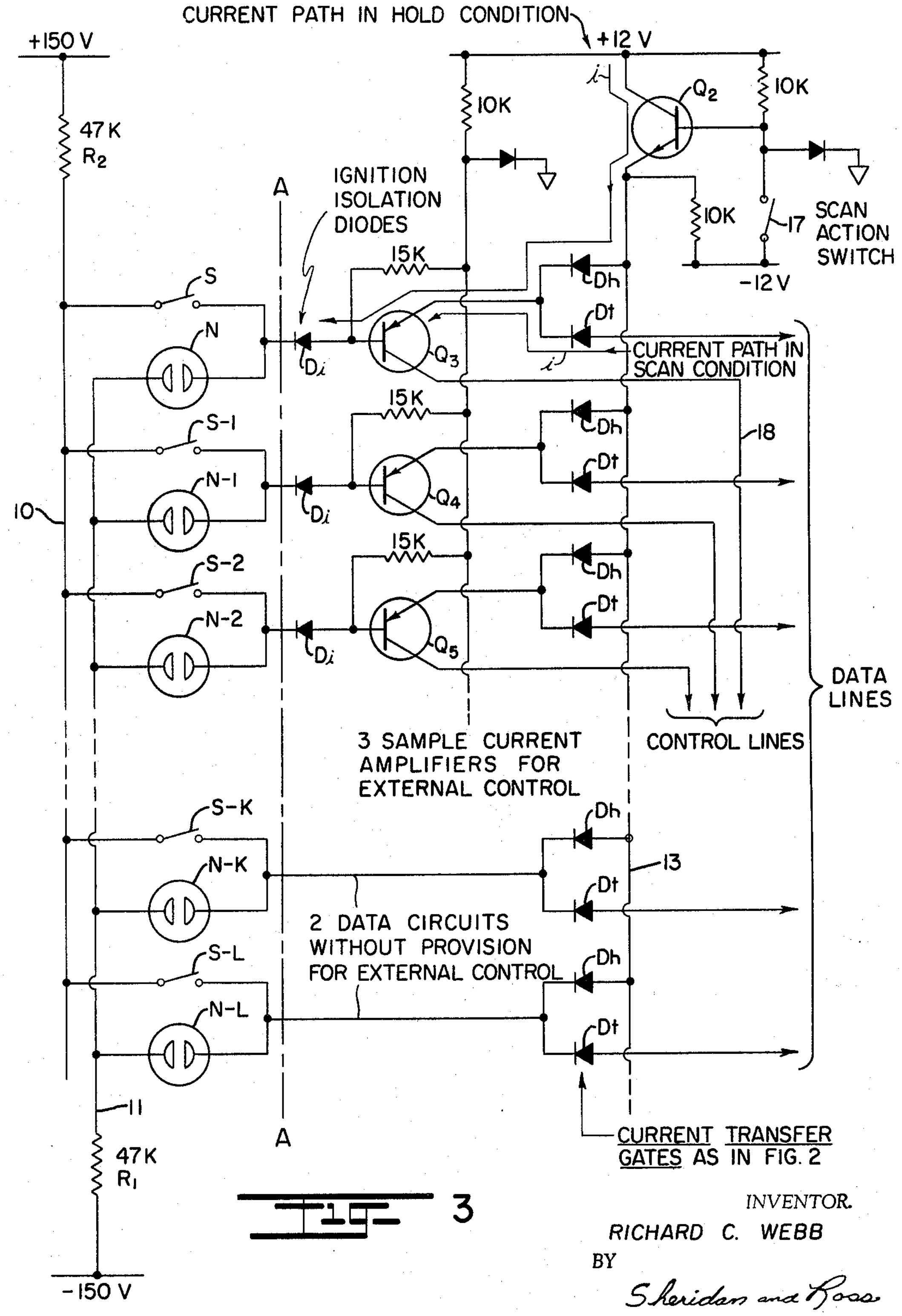
FIGURE 3 is a circuit diagram showing a system of electric current amplifiers combined with the memory circuit and the system of transfer gates of FIGURE 2, also in accordance with the invention.

To provide for such external control, the circuit illustrated in FIGURE 3 has been developed which, in addition to the circuit of FIGURE 2, includes a system of electric current amplifiers designed to provide sufficient electric currents to control external components, circuit elements, etc. That portion of the circuit of FIGURE 3 lying to the left of the vertical broken line A—A will be recognized to be similar to the mutual lockout neon glow lamp memory circuit portion to the left of line A—A in FIGURE 2. The current transfer gates (diodes $D_h$ and $D_t$) shown near the right side of FIGURE 3 will be seen to be similar to those described in connection with FIGURE 2. The principal difference between the current transfer gate circuit shown in FIGURE 3 and that shown in FIGURE 2 is the introduction of a NPN transistor $Q_2$, which serves as an emitter follower in the scanning circuit to better meet the control current requirements of the external circuit than would be possible with the current transfer gate circuit shown in FIGURE 2. The base of $Q_2$ is connected: through a 10K resistor to the $+12$ v. source; through a forward biased diode to ground; and through scan switch 17 to the $-12$ v. source. The collector of $Q_2$ is connected to the $+12$ v. source and the emitter of $Q_2$ is connected to the anodes of the holding diodes $D_h$ by a conductor 13 and to the $-12$ v. source through a 10K resistor.

The circuit of FIGURE 3 also includes a plurality of PNP current amplifier transistors $Q_3$, $Q_4$ and $Q_5$ separately connected between the memory circuits and the current transfer gate circuits of FIGURE 2. The emitter-base junction of the current amplifier transistors $Q_3$, $Q_4$ and $Q_5$ each have been connected in series between a neon glow lamp and a current transfer gate. The collectors of transistors $Q_3$, $Q_4$ and $Q_5$ are connected to separate control lines. In addition, a 15K resistor is connected to the base of each transistor. The other end of the 15K resistors are connected through a common 10K resistor to the $+12$ v. source. The junction between the 10K resistor and the 15K resistors is connected through a forward biased diode to ground. Only three neon glow lamps *n*, *n*–1 and *n*–2 have been so connected to provide three current paths for the purpose of illustrating the method of providing external control through the three control lines shown. Two neon glow lamps *n–k* and *n*–L of the memory circuit are shown not connected to current amplifiers, but have data line outputs to illustrate the flexibility of the control circuit of FIGURE 3 for use interchangeably with and without the external control provision.

An isolation diode denoted $D_i$ is connected in series between each neon glow lamp of the set *n*, *n*–1 and *n*–2 and the base of the appropriate current amplifier transistor of the set $Q_3$, $Q_4$ and $Q_5$ so that anodes of the isolation diodes are connected to the transistor. Each of the three diodes $D_i$ serves to isolate the base-emitter junctions of the transistors $Q_3$, $Q_4$ and $Q_5$ from the excessive voltage that would appear at the junctions when the momentary contact switches *s*, *s*–1 and *s*–2, associated with the corresponding neon glow lamps, are closed.

It will be understood that the collector terminals of current amplifier transistors $Q_3$, $Q_4$ and $Q_5$ can be connected via load circuits to a source of voltage which is negative with respect to ground potential and that electric currents of these external circuits of magnitudes up to beta times the current flowing in the neon glow lamps can be supplied by the current amplifier transistors $Q_3$, $Q_4$ and $Q_5$. Beta is the current amplification factor of the transistors used in the circuit.

The operation of the circuit of FIGURE 3 is similar to that of FIGURE 2. The scanning action commences with the closing of scan action switch 17. Closing of scan action switch 17 causes the switching of a current $i$ from holding diode $D_h$ to transfer diode $D_t$ for the neon glow lamp that is glowing, such as lamp *n*, for example, as indicated by the arrow and note in FIGURE 3. This output current $i$ can be sensed with the aid of an output amplifier (not shown in FIG. 3) as illustrated by output amplifier $Q_1$ in the circuit shown in FIGURE 2. That is, an output amplifier such as $Q_1$ of FIG. 2 can be connected to the anodes of the $D_t$ diodes to sense the current transfer on the data lines. In addition, this output current $i$, through electric current amplifier transistor $Q_3$ is amplified and sent through line 18 to control an external circuit, relay, motor or the like, as previously described.

Obviously, many other modifications and variations of the present digital data storage, recording and transmission system of the invention are possible in the light of the teachings given hereinabove. It is, therefore, to be understood that, within the scope of the appended claims, the invention can be practiced otherwise than as specifically described.

What is claimed is:

1. A data storage and recording circuit comprising:
triggerable electronic means having an activation and a de-activation threshold level for controlling the passage of current;
switch means for allowing the passage of current;
a potential source of one polarity;
a potential source of the opposite polarity to said first potential source;
said triggerable electronic means and said switch means connected in series between said first and second potential sources;
holding unidirectional current flow control means for controlling the flow of current;
transfer unidirectional current flow control means for controlling the flow of current;
said holding and transfer unidirectional current flow control means having a similar terminal connected to the junction between said triggerable electronic means and said switch means;
a third source of potential connected to said holding unidirectional current flow control means; and
a data line connected to said transfer unidirectional current flow control means.

2. A circuit as claimed in claim 1 including a first amplifier connected to said data line.

3. A circuit as claimed in claim 2 including:
a second amplifier;
a third unidirectional current flow control means for controlling the flow of current; and
said second amplifier and said third unidirectional current flow control means connected in series between the junction of said triggerable electronic means and said switch means, and said holding and said transfer unidirectional current flow control means.

4. Apparatus as claimed in claim 3 including a third amplifier connected between said holding unidirectional current flow control means and said third potential source.

5. A digital data storage and recording circuit which comprises: a first voltage line connected to a source of positive voltage; a second voltage line connected to a source of negative voltage; a plurality of circuits in parallel relationship with respect to each other connected across the first and second voltage lines, each of said circuits including a neon glow lamp and a switch means; a third voltage line connected at one end to a source of positive voltage and at the other end to a source of negative voltage; a set of electric curren transfer gates connected in parallel relationship with respect to each other and between said plurality of circuits, and said third voltage line, each of said transfer gates including a holding diode and a transfer diode in parallel relationship with respect to each other and each of said gates being connected to one of said plurality of circuits and scanning means associated with the third voltage line for transferring externally the data stored in the neon glow lamps.

6. A digital data storage and recording circuit which comprises: a first voltage line connected to a source of positive voltage; a second voltage line connected to a source of negative voltage; a plurality of circuits in parallel relationship with respect to each other connected across the first and second voltage lines, each of said circuits including a neon glow lamp and a switch; an ignition resistance connected in the first voltage line; a common path resistance connected in the second voltage line; a third voltage line connected at one end to a positive voltage source and at the other end to a negative voltage source; a set of electric current transfer gates connected in parallel relationship with respect to each other and between said plurality of circuits and said third voltage line, each of said transfer gates including a holding diode and a transfer diode in parallel relationship with respect to each other and each of said gates being connected to one of said plurality of circuits; and scanning means connected to the third voltage line for switching current passing through a glowing neon glow lamp from the holding diode associated therewith to the transfer diode associated with the glowing lamp; and means for receiving the transferred current.

7. A digital data storage and recording circuit which comprises: a first voltage line connected to a source of positive voltage; a second voltage line connected to a source of negative voltage; a plurality of circuits in parallel relationship with respect to each other connected across the first and second voltage lines, each of said circuits including a neon glow lamp and a switch; an ignition resistance connected in the first voltage line; a common path resistance connected in the second voltage line; a third voltage line connected at one end to a positive voltage source and at the other end to a negative voltage source; a set of electric current transfer gates connected in parallel relationship with respect to each other and between said plurality of circuits and said third voltage line, each of said transfer gates including a holding diode and a transfer diode in parallel relationship with respect to each other and each of said gates being connected to one of said plurality of circuits; a common path resistance connected in the third voltage line, a clamping diode connected to the third voltage line and to ground potential to form a common holding line through the holding diodes of the electric transfer gates; said voltage sources, neon glow lamps and resistances being chosen for mutual lock-out operation of the lamps through normal operation of their associated switches; and scanning switch action means connected to the third voltage line for switching current passing through a glowing neon glow lamp from the holding diode associated therewith to the transfer diode associated with the glowing lamp; and a common data line connected to the third voltage line and to means for recording the data stored in the neon glow lamps.

8. A digital data storage, recording and control system which comprises: a first voltage line connected to a source of positive voltage, a second voltage line connected to a source of negative voltage; a plurality of circuits in parallel relationship with respect to each other connected across the first and second voltage lines, each of said circuits including a neon glow lamp and a switch means, an ignition isolation diode connected to each of said plurality of circuits; an electric current amplifier connected to each of the ignition isolation diodes, a third voltage line connected to a source of positive voltage and to a source of negative voltage; a set of electric current transfer gates connected in parallel relationship with respect to each other between the electric current amplifiers and to said third voltage line, each of said transfer gates including a holding diode and a transfer diode in parallel relationship with respect to each other; and scanning means associated with the third voltage line as a means for transferring and recording the data stored in the neon glow lamps.

9. A digital data storage and recording circuit which comprises: a first voltage line connected to a source of positive voltage; a second voltage line connected to a source of negative voltage; a plurality of circuits in parallel relationship with respect to each other connected across the first and second voltage lines, each of said circuits including a neon glow lamp and a switch; an ignition resistance connected in the first voltage line; a common path resistance connected in the second voltage line; an ignition isolation diode connected to several of said plurality of circuits; an electric current amplifier transistor connected to each of the ignition isolation diodes; a third voltage line connected to a source of positive voltage and to a source of negative voltage; a set of electric current transfer gates connected in parallel relationship with respect to each other between the electric current amplifier transistors and to said third voltage line, each of said transfer gates including a holding diode and a transfer diode in parallel relationship with respect to each other; and scanning means connected to the third voltage line for switching current passing through a glowing neon glow lamp from the holding diode associated therewith to the transfer diode associated with the glowing lamp; and means for recording the data stored in the neon glow lamps.

10. A digital data storage and recording circuit according to claim 9, wherein an emitted follower transistor is connected in the scanning means for meeting control current requirements to transmit the stored data through control lines to external control means.

References Cited

UNITED STATES PATENTS

| | | | |
|---|---|---|---|
| 2,619,282 | 11/1952 | Manley | 315—165 X |
| 2,709,042 | 5/1955 | Couffignal | 340—173 X |
| 2,761,998 | 9/1956 | Chen | 315—176 X |
| 3,048,821 | 8/1962 | Burstow et al. | 179—18 |

BERNARD KONICK, *Primary Examiner.*

J. F. BREIMAYER, *Assistant Examiner.*